United States Patent [19]
Batchelor et al.

[11] Patent Number: 5,789,649
[45] Date of Patent: Aug. 4, 1998

[54] METHOD FOR REMEDIATING CONTAMINATED SOILS

[75] Inventors: Bill Batchelor, Bryan, Tex.; Alison Marie Hapka, Chadds Ford, Pa.; Godwin Joseph Igwe, Newark; Richard Howard Jensen, Wilmington, both of Del.; Michael F. McDevitt, Chester, Pa.; Dale S. Schultz, Hockessin; Joyce May Whang, Wilmington, both of Del.

[73] Assignee: E. I. du Pont de Nemours and Company, Wilmington, Del.

[21] Appl. No.: 703,715

[22] Filed: Aug. 27, 1996

Related U.S. Application Data

[60] Provisional application No. 60/003,560 Aug. 29, 1995.

[51] Int. Cl.$^6$ .................. A63D 3/00; C09K 17/00
[52] U.S. Cl. .................. 588/206; 588/209; 588/252; 405/263
[58] Field of Search ................ 588/204, 205, 588/206, 252; 405/263

[56] References Cited

U.S. PATENT DOCUMENTS

| | | | |
|---|---|---|---|
| 3,640,821 | 2/1972 | Sweeny et al. | 210/59 |
| 3,737,384 | 6/1973 | Sweeny et al. | 210/59 |
| 4,337,368 | 6/1982 | Pytlewski et al. | 568/730 |
| 4,351,718 | 9/1982 | Brunelle | 208/262 |
| 4,382,865 | 5/1983 | Sweeny | 210/743 |
| 4,400,552 | 8/1983 | Pytlewski et al. | 568/715 |
| 4,447,541 | 5/1984 | Peterson | 435/264 |
| 4,601,817 | 7/1986 | Globus | 588/206 |
| 4,615,809 | 10/1986 | King | 588/205 |
| 4,842,448 | 6/1989 | Koerner et al. | 405/258 |
| 4,855,083 | 8/1989 | Kagawa et al. | 588/213 |
| 5,064,526 | 11/1991 | Rogers et al. | 208/262.5 |
| 5,114,497 | 5/1992 | Johnson et al. | 134/21 |
| 5,197,823 | 3/1993 | Cutshall et al. | 405/128 |
| 5,431,825 | 7/1995 | Diel | 588/236 |
| 5,591,116 | 1/1997 | Pierce | 588/901 |
| 5,616,253 | 4/1997 | Fernando et al. | 423/240 R |
| 5,618,427 | 4/1997 | Soech et al. | 588/257 |

FOREIGN PATENT DOCUMENTS

| | | | |
|---|---|---|---|
| 2079282 | 3/1994 | Canada | C09K 17/00 |
| 12162 | 6/1986 | European Pat. Off. | C02F 1/70 |
| 502460 | 9/1992 | European Pat. Off. | C02F 1/28 |
| 595441 | 5/1994 | European Pat. Off. | A62D 3/00 |
| 3810707 | 10/1989 | Germany | 588/207 |
| 2255087 | 10/1992 | United Kingdom | C02F 1/70 |

OTHER PUBLICATIONS

Matheson, Leah J. et al., Reductive Dehalogenation of Chlorinated Methanes by Iron Metal, *Environ. Sci. Technol.*, 28, 2045–2053, 1994.

Gillham, Robert W. et al., Enhanced Degradation of Halogenated Aliphatics by Zero–Valent Iron, *Ground Water*, 32(6), 958–967, 1994.

*Primary Examiner*—Gary P. Straub

[57] ABSTRACT

A method is disclosed for the degradation of persistent contaminants in soil. The method provides the combination of a stabilizing reagent and a degradative reagent where both are admixed into a contaminated soil site for the reduction of permeability at the site and the chemical degradation of the contaminant over time.

9 Claims, 3 Drawing Sheets

METHOD FOR REMEDIATING CONTAMINATED SOILS

This application claims the priority benefit of U.S. Provisional Application 60/003,560, filed Aug. 29, 1995.

FIELD OF INVENTION

The present invention relates to the field of environmental remediation and specifically to the remediation of pollutants in contaminated soil. More specifically the instant invention provides a method for the remediation of toxic compounds from soil whereby the contaminated soil is stabilized in the presence of a pollutant degradative agent.

BACKGROUND

Soil and groundwater pollution is a worldwide problem associated primarily with government and industrial sites where mishandling or improper disposal of chemicals has brought a variety of pollutants in contact with the soil. Common pollutants include hydrocarbons, heavy metals, and halogentated volatile organic solvents such as tetra-, tri-, or di- chloroethylene, carbon tetrachloride, chloroform and methylene chloride. The toxicology of many organic solvents suggests that these compounds may be carcinogenic and damaging to specific organs such as the liver and kidneys (Price, P. S., Memo of the U.S. Environmental Protection Agency, Office of Water, Washington, D.C. (1985); Vogel, T. M., Environ. Sci. Technol. 21, 722, (1987)).

Many of the most troublesome solvents fall into the category of dense non-aqueous phase liquids (DNAPLs). The remediation of DNAPLs is problematic since, their high density and low water solubility cause them to sink through the soil and water and follow topographic lows within an aquifer system often accumulating atop the underlying clay stratum. Further, since most are sparingly soluble in water they are adsorbed on to soil particles producing tenacious underground plumes of dissolved organic which cannot be readily and permanently removed by standard pump and treat technology (Biswas, N., et al., Water Environ. Res. 64,170,10,1(992); Hutter, G. M., et al., Water Environ. Res. 64, 69, (1992)).

Current methods for remediation of DNAPLs include excavation, slurry walls, cutoff trenches, in-situ biodegradation and pump and treat. Because of the pervasive nature of DNAPL contamination a common approach to remediation has been to treat the DNAPL contaminated groundwater plume as opposed to addressing the source of contamination. One successful method for groundwater plume treatment involves-the use of zero valent metals. For example, Matheson et al., (Environ. Sci. Technol., 28, 2045, (1994)) disclose a method for the reduction of chlorinated solvents by fine-grained iron metal in a well-mixed anaerobic batch system. Similarly R. Gillham (U.S. Pat. No. 5,266,213) teaches a method for the decontamination of chlorinated solvents from a groundwater plume where the contaminated groundwater is fed through a trench containing iron filings under strict exclusion of oxygen and under highly reducing conditions. Finally, Sweeny et al., (U.S. Pat. No. 3,640,821) teach that halogenated organic pesticides, typified by DDT, chlordane, lindane and the like, may be degraded by reacting them with metallic zinc under mildly acid conditions (U.S. Pat. No. 3,640,821) or by metallic couples such as iron and copper (U.S. Pat. No. 3,737,384).

The above methods are useful for the treatment of dissolved groundwater plumes but do not address how the source of DNAPL contamination may be remediated in-situ.

Methods of treating soil contamination with elemental metals are known. For example, Cutshall et al., (U.S. Pat. No. 5,197,823) disclose a method for treating polychlorinated biphenyl (PCB) contaminated soils by adding an effective amount of elemental zinc powder to moistened soil. In similar fashion Butler et al., (J Environ Sci Health Part B Pestic Food Contam Agric Wastes 16, 95, (1998)) disclose the reductive dechlorination of dieldrin and endrin in soil samples containing powdered zinc metal in combination with acetic acid and acetone to facilitate the reaction.

These methods of treating soils are useful, but cannot be applied to DNAPL source treatment. An effective method of deactivating the source of DNAPL contamination is by reducing the permeability of the contaminated region to water flow. This is typically done through the use of stabilizing agents. Stabilizing reagents can be selected or designed to greatly reduce the permeability of the soil, thereby diverting groundwater around a contaminated area, thereby preventing further leaching into the groundwater. Stabilizing agents also function to a reduce the hazard of a waste by binding and converting the contaminants into a less soluble, less mobile or less toxic forms. Typical stabilization reagents include portland cement, metal oxides, clays, natural materials (peat moss, natural zeolites, vermiculite, etc.), synthetic materials (zeolites, fly ash, organic polymers, etc.), and activated carbon. (Conner, J. R., *Chemical Fixation and Solidification of Hazardous Wastes*, Van Nostrand Reinhold, 115 Fifth Avenue, New York, New York, 10003, (1990)).

Although stabilization technologies are now widely used for treatment of hazardous waste sludge, power plant residues, municipal ashes, nuclear wastes, and contaminated soils, these processes have shortcomings for organic contaminants, including the difficulty in demonstrating the long-term stability of the treated waste and the fact that the contaminants are not destroyed or degraded.

The problem to be overcome therefore is to develop a method that will chemically attack the source organic DNAPL's in the soil and effectively prevent the contaminant from migrating in the groundwater. Applicants have solved this problem by developing a method that combines the use of stabilization technology to reduce water permeability at the contamination source and a degradative agent that facilitates the destruction of the organic contaminant in its stabilized form. Although both elements of this method have been practiced separately, applicants are the first to teach how to combine the two technologies such that the two are operable in concert. Applicants method reduces the permeability at the contamination source by adding/mixing a stabilizing agent such as cement, bentonite clay or iron chloride with a degradative agent such as elemental iron, metal couples or a base catalyzing decomposition agent. Introduction of the combined stabilizing agent/degradative agent into a contaminated area results in the diverting of the majority of groundwater flow around the source volume (thus preventing leaching into the groundwater) while at the same time binding and destroying the contaminant.

SUMMARY OF THE INVENTION

It is an object of the present invention to provide a method for the chemical degradation and stabilization of chemical pollutants at a contamination source in a soil contaminated with pollutants comprising admixing with the soil at said contamination source an effective amount of degradative reagent and a suitable stabilizing agent to form a stabilized degradive reagent such that said admixing results in the reduction of permeability at said contamination source and the degradation of said pollutant over time.

It is a further object of the present invention to provide a method for the metal initiated chemical degradation of halogenated organic compounds from soil contaminated with halogenated organic compounds comprising adding an effective amount of a metallic couple comprising a reductive zero valent metal and a metal catalyst wherein said metallic couple dehalogenates said halogenated organic compounds to reduce their concentration.

DETAILED DESCRIPTION OF THE INVENTION

Figure 1:
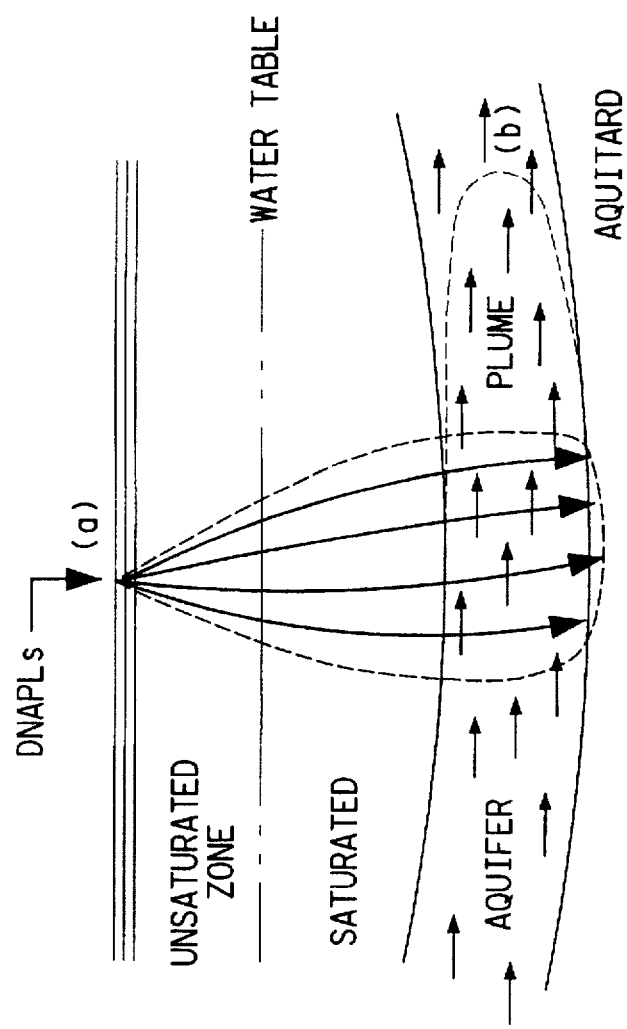
FIG. 1 is an illustration of a DNAPL contaminated site showing the flow of the pollutant through the soil and into the aquifer.

As used herein the following terms may be used for interpretation of the claims and specification.

The term "degradative agent" will refer to any agent that when mixed with a suitable soil stabilizing material will effect the chemical degradation of the contaminant of interest. Degradative reagents may include but will not be limited to zero valent metals, and alkaline reagents.

The term "metal initiated chemical degradation" refers to the degradation of halogenated organic compounds by chemical means involving the reductive dehalogenation of the compound in the presence of a reductive, zero valent metal. Optionally the chemical degradation may take place additionally in the presence of a metallic catalyst.

The term "contaminant" or "pollutant" or "organic contaminant" will refer to toxic chemical species. Typical contaminants will include those chemical species that are persistent in the environment and are known to be toxic to humans and wildlife such as halogenated organics, hydrocarbons and organometals.

The term "contamination source" will refer to a high concentration of pollutant or contaminant in soil, such as occurs in the region of a release or spill.

The term "contamination plume" will refer to a concentration of pollutant or contaminant that has leached from a contamination source and has entered the groundwater aquifer.

The term "halogenated organic compounds" will refer to halogenated pollutants commonly found in soil and groundwater. Typical halogenated organics remediated by the present invention will be chlorinated solvents such as carbon tetrachloride ($CCl_4$), tetrachlorethylene or perchlorethylene (PCE) and trichloroethylene (TCE).

The term "contaminated soil" or "contaminated site" will refer to any soil or any site containing soil, either at ground level or subsurface that contains unacceptable levels of contaminants or pollutants.

The term "zero valent metal" will refer to any metal in its elemental state capable of reducing halogenated organic compounds. Typical zero valent metals suitable in the present invention are iron and zinc.

The term "metallic couple" will refer to the combination of a reductive metal such as zero valent metal and a metal catalyst such as coppers in a ratio so as to be effective in the degradation of halogenated organic compounds.

The term or symbol "Fe/Cu" will refer to the metallic couple of iron and copper.

The term or symbol "Fe/Pd" will refer to the metallic couple of iron and palladium.

The term "stabilized degradative reagent" refers to a reagent comprising a stabilizing agent and a degradative agent in concentrations and under conditions whereby the reagent will effectively degrade contaminants of interest.

The instant invention provides a method for the chemical degradation of pollutants, and particularly organic pollutants from soil at the source of the contamination. The present method uses a combination of a stabilizing agent and a degradative agent to both decrease permeability at the contaminated source while at the same time degrading the contaminant.

In one embodiment the invention uses zero valent metal particles in combination with a metallic catalyst as the degradative agent where the metal couple is either admixed into the soil or combined with a stabilizing reagent. The combination of metallic couple and stabilizing agent is particularly effective for the destruction of halogenated organics such as chlorinated organic solvents. The combination of the metallic couple with the stabilizing agent has the effect of reducing the permeability of the soil to groundwater flow and prevents the halogenated organic contaminant from being drawn into the aquifer and forming a contamination plume.

The instant method is useful for the remediation of organic contaminants, and particularly chlorinated organic compounds which are persistent in the environment and pose a health risk to humans and wildlife. The method may be used in situ and eliminates the need for expensive and hazardous handling of contaminated water required by standard pump and treat methods. The instant method may be used for the remediation of industrial sites as well as for the decontamination of waste dumps and chemical waste streams.

COMPOUNDS DEGRADED

Compounds that are susceptible to degradation by the instant method are those that will serve as substrates for various suitable degradative agents. It is contemplated that the present method will be effective in degrading halogenated organic solvents (chloroform, trichloroethylene (TCE), tetrachloroethylene or perchloroethylene (PCE), methylene chloride, polychlorinated biphenyls (PCBs) and carbon tetrachloride). Compounds shown to be particularly susceptible to the instant methods are straight chain chlorinated organic solvents such as trichloroethylene, tetrachlorethylene and carbontetrachlroide.

DEGRADATIVE AGENTS

The present invention provides a variety of degradative agents that may be used in combination with a stabilizing reagent. Suitable degradative agents fall into four categories comprising either metal couples such as iron/copper or iron/palladium, metal on carbon (Pt/C, Pd/C Rh/C), metal oxides such as manganese oxide, and alkaline reagents useful in base catalyzed degradation of pollutants.

Metallic Couples:

In a preferred embodiment the present invention utilizes a metallic couple as a degrading reagent to treat soil contaminated with halogenated organic compounds. Typically one of the metallic components is a zero valent metal and the other component is a metallic catalyst. Zero valent metals useful in the present invention include but are not limited to iron, zinc, aluminum, cadmium, and magnesium.

Although metallic couples have been used for the remediation of halogenated organics in groundwater, little or nothing is known about the application of zero-valent metals, such as iron or zinc or copper in soils contaminated with high concentrations of volatile organic compounds typical of spill areas. Uncertainty in how metallic couples will respond in spill areas lies in a number of factors. For example, problems associated with controlling the pH of the degradative process and the deactivation of the metal surface, make the practical application of this technique difficult and the result uncertain.

One model for reductive dehalogenation by iron involves hydrogen evolution as a product of corrosion with water. Iron will reduce a chlorinated organic according to the following reaction (1):

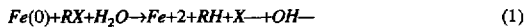

$$Fe(0)+RX+H_2O \rightarrow Fe+2+RH+X-+OH- \qquad (1)$$

Hydrogen will evolve according to (2) as follows:

$$Fe(0)+2H+ \rightarrow Fe+2+H2 \qquad (2)$$

Reductive dehalogenation is then able to proceed acceding to reaction (3) in the presence of a catalysts such as copper or palladium:

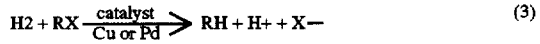

$$H2 + RX \xrightarrow{\text{catalyst}}_{\text{Cu or Pd}} RH + H+ + X- \qquad (3)$$

In the absence of an effective catalyst, H2 is not a facile reductant, and this reaction will not contribute directly to dehalogenation. Excessive H2 accumulation at the metal surface is known to inhibit the continuation of corrosion and of reduction reactions in organic synthesis(Degani, R., Chemical and Engineering News, 21, June 24, 1991). Rapid dehalogenation by H2 is still possible, however, if an effective catalyst is available(Degani, supra ). The surface of iron, its defects, or other solid phases present in the system could provide this catalyst. For the purposes of the present invention iron was selected as the preferred metal due to its low cost and availability, and copper and palladium were selected as the preferred catalysts. The net reaction describing the dehalogenation of organics, such as carbon tetrachloride by a metal or metallic couple is as follows:

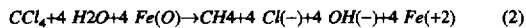

$$CCl_4+4 H2O+4 Fe(O) \rightarrow CH4+4 Cl(-)+4 OH(-)+4 Fe(+2) \qquad (2)$$

The stoichiometric ratio of iron to carbon tetrachloride is calculated as follows:

1 g CCl$_4$ × mole CCl$_4$/153.812 g CCl$_4$ × 4 mole Fe/mole CCl$_4$ ×

× 55.847 g Fe/mole Fe

= 1.45 g Fe

Thus, stoichiometry requires 1.45 grams of iron for each gram of carbon tetrachloride. In order to provide adequate driving force for the reaction, more than the stoichiometric requirement of iron should be used initially.

It will be appreciated that this ratio is calculated for pure carbon tetrachloride. The amount of iron needed to treat a ton of soil contaminated by carbon tetrachloride will depend on the concentration of carbon tetrachloride in the soil. Table 1 below lists a range of carbon tetrachloride concentrations (in soil) and minimum amounts of iron that would be needed to treat them.

TABLE 1

Range of Treatment Options

| % CCl$_4$ in soil | ppm CCl$_4$ in soil (mg/kg) | g CCl$_4$ per ton | g Fe needed | lb Fe per ton of soil |
|---|---|---|---|---|
| 5.0% | 50,000 | 45,400 | 65,909 | 145 |
| 3.0% | 30,000 | 27,240 | 39,545 | 87 |
| 1.0% | 10,000 | 9,080 | 13,182 | 29 |
| 0.5% | 5,000 | 4,540 | 6,591 | 15 |
| 0.1% | 1,000 | 908 | 1,318 | 3 |

Table 1 lists minimum quantities of iron needed for treatment based on theoretical considerations. As a practical matter, use of an excess quantity of iron for in situ remedidation of a contaminated site is preferred for a number of reasons. For example, iron may participate in other reactions and therefore become unavailable for reaction with carbon tetrachloride. Further, an excess of iron drives the reaction to completion in time.

Although Fe/Cu and Fe/Pd metallic couples are preferred it will be appreciated that couples comprising one or more catalytic metals with two or more reductive metals will also be effective. It is further contemplated that the present invention may be practiced using only the reductive metal without the catalyst. Examples of metallic couples expected to be effective in the reaction include zinc-copper, zinc-silver, iron-copper, iron-palladium, aluminum-copper, magnesium-copper, cadmium-copper and zinc-iron-copper, where iron-copper and iron-palladium are the most preferred.

Metallic couples may be used in a ratio about 99.9% reductive metal to 0.1% catalytic metal where at ratio of about 90–95% reductive metal to about 10–5% catalytic metal is preferred for low cost catalysts. For higher cost catalysts, such as palladium, 0.05% or less catalyst on iron may be sufficient.

Although a highly effective use of the metallic couple is in combination with a suitable stabilizing agent, it is understood that the metallic couple will function as degradative agents in soil alone, even at high organic concentrations. This is a surprising finding since heretofore the only use of metallic couple for the reductive dehalogenation of organic solvents has been in groundwater. This is primarily because, as mentioned above, problems associated with controlling the pH of the process and the deactivation of the metal surface make it difficult to predict if the technique will be effective in the remediation of high concentrations of halogenated organics.

Base Catalyzed Degradative Agents:

In another embodiment it is contemplated that various agents capable of fostering base catalyzed degradation of pollutants may also be used as a degradative agent. It is known for example that base catalyzed degradation is effective for the degradation of compounds such as polychlorinated biphenyls (PCBs), pentachlorophenol (PCP), lindane, and chlorinated dibenzodioxins and furans (Report (1992), Order No. PB93-182939, 7 pp. Avail.: NTIS From: Gov. Rep. Announce. Index (U.S.) 1993, 93(15), Abstr. No. 344,810). Alkaline agents particularly useful in such process include alkali or alkaline earth metal carbonate, bicarbonate, or hydroxide (U.S. Pat. No. 5,064,526).

STABILIZATION AND REDUCTION OF PERMEABILITY

In one embodiment of the invention a suitable soil stabilizing reagent is mixed at an effective concentration with degradative agent that is then applied to contaminated soil for the combined effect of reducing soil permeability and organic contaminant degradation. A variety of stabilizing reagents are known and are contemplated to be useful in the instant invention. Typical stabilizing agents may include but are not limited to Portland cement, soluble silicates-cement, pozzolan-lime, pozzolan-cement, clay cement, clays such as bentonite, iron chloride mixtures, and fly ash.

Clay Stabilizers such as Bentonite:

Bentonite clay, for instance, is a high swelling, sodium montmorillonitic clay mineral, which, because of its mineralogical structure, has the capability of taking water between the structural sheets. Sodium montmorillonite is ideally composed of two sheets of silica tetrahedron on either side of an octrahedral gibbsite sheet. Isomorphous substitution within the layers of the sheet result in charge deficiencies. Cations may be present between the layers to balance the charge deficiencies. These interlayer bonds are therefore relatively weak and easily separated by imposed stresses such as the adsorption of water or other polar liquids. Hence, montmorillonitic clays may swell to approximately 200 times their original volume. (Evans, et al., "Influence of Industrial Wastes on the Geotechnical Properties of Soils," Proc. of the 15th Mid-Atlantic Ind. Waste Conf., Bucknell University, Bethlehem, PA. (1983)). This characteristic makes these materials useful in civil engineering-applications such as soil-bentonite slurry trench cutoff walls. However, the reversibility of such swelling also subjects these materials to the potential for chemical "incompatibility" with the contaminated groundwater or waste fluids. Although much has been published regarding investigations of clay liner-waste interaction, little information is presently available regarding soil-bentonite-waste interactions, and nothing is previously published on the interaction of clay with metal dehalogenation.

It is one object of the present invention to mix such clay powders into contaminated soil in the presence of a degradative agent to decrease the permeability (saturated hydraulic conductivity), divert groundwater away from the contamination, and ensure destruction of a contaminated zone by entrapping and immobilizing both the contaminant source and the plume. By immobilization of the contaminants source in the affected aquifer region through sealing and entombing them in a monolith of clay, an impermeable container is created to surround and isolate the contaminated region for reaction with a suitable degradative reagent such as zero valent iron/copper.

Metal Solutions Stabilizers and Grouts:

One stabilizing or grouting system of particular interest is a metal solution mixture designed to precipitate solid phase metal compounds over time into a soil contaminated area. Precipitation of the metal phase effectively reduces soil permeability and hydraulic conductivity. This system comprises a metal solution such as iron chloride at an initially acid pH, in combination with an enzyme and suitable enzyme substrate, such as urease and urea. Additionally, the mixture may contain a chelating agent such as citric acid that functions to raise the pH level at which the metal will precipitate from solution. The enzyme and enzyme substrate are chosen so as to slowly increase the pH of the metal solution over time and thus effect the gradual precipitation of the metal from solution.

By way of explanation, the metal solution may be mixed with a chelator and an alkaline agent at a time significantly in advance of when the solution will be introduced to an area to be treated. Preferably, the enzyme should be added to the solution within about 1 to 48 hours prior to introduction into the contaminated soil since substantial precipitation will occur in this time period.

The metal solution of this invention typically has a metal concentration in the range of about 0.1% to 10% by weight metal salt. Preferably the range will be about 1% to 7% metal by weight. Typical metals include ferric chloride, ferrous chloride, and ferrous sulfate.

The exact conditions needed for a solution of this invention (e.g., amount of chelating agent and alkaline agent) will depend on the initial pH, and the desired amount and type of metal salt present. For iron solutions, the solubility of the iron is very dependent on the pH of the solution, and on the redox potential of the iron. At very low pH's (0 to 2), iron is in the form of either $Fe^{3+}$ or $Fe^{2+}$ At pH of about 2, the $Fe^{3+}$ becomes $Fe(OH)3$. Then at a pH of about 8, $Fe^{2+}$ becomes $Fe(OH)2$.

Various methods can be used to place the metal solution into the soil to be treated. Typical methods include jet grouting, permeation grouting or deep soil mixing. The preferred method will depend on the particular application. Where chemical grouting is needed to establish physical barriers or walls, and even floors, to contain hazardous waste, jet grouting is a useful method. For more information on these methods see Reuban Karol, *Chemical Grouting*, 2d edition, Marcel Dekker, Inc., New York (1990).

MIXING DEGRADATIVE AND STABILIZING REAGENTS

Typically degradative and stabilizing reagents will be mixed into the soil simultaneously in appropriate concentrations and condition to allow for the degradation of the contaminant or pollutant of interest.

When using clays or powders the concentration of clay in the soil may range from 1% to abut 10% where a range of 5% to 8% is preferred. Similarly if metallic couples such as Fe/Cu are used it is preferred if the metallic couple is present in the soil at a concentration of about 1% to 10% where a range of 2% to 5% is most preferred. But the amount of metallic reactant is dependent on the amount of organic contaminant to be destroyed.

It is understood that the present method will operate at a wide range of temperatures ranging from 0° C. to 100° C. where ambient temperature is preferred.

One of the advantages of the present invention is that it is not necessary to pre-treat contaminated site with various reagents to maintain desirable pH levels. The present method is operable at pHs in the range of 2.0 to 10.0 where a pH of 7.0 is preferred.

Figure 2:
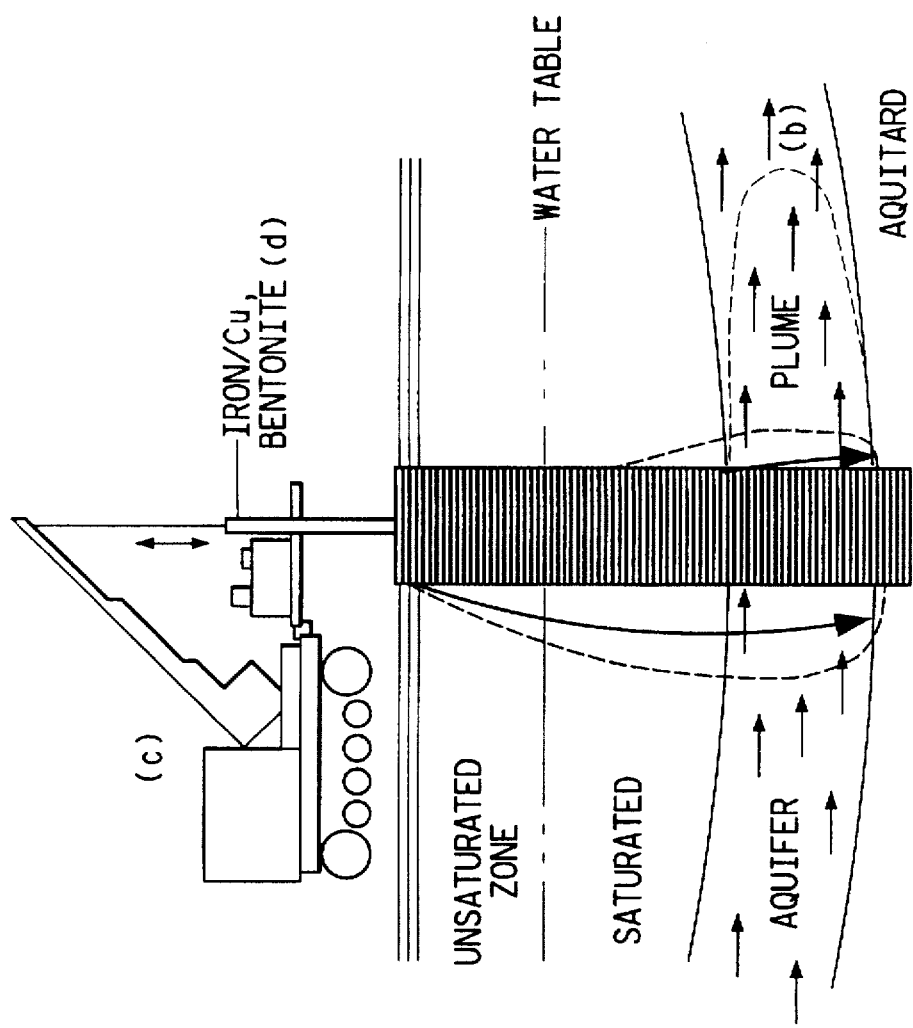
FIG. 2 is an illustration of the remediation of a contaminated site using a mixing means to add a stabilized degradative reagent to a contamination source.
Figure 3:
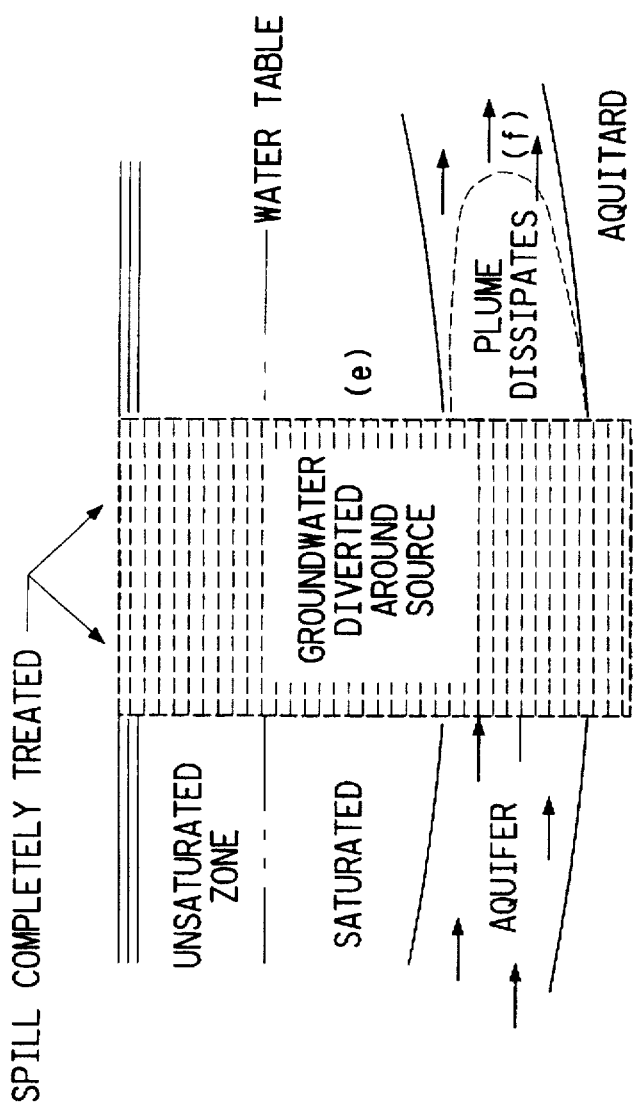
FIG. 3 is an illustration of a contaminated site post treatment by the method of the present invention.

In one embodiment soil, contaminated with a halogenated organic, may be remediated in situ at the source of contamination by admixing a suitable amount of stabilized degradative reagent into the soil at the affected area. FIGS. 1–3 illustrate how such a process would be accomplished.

Typically a source of contamination (FIG. 1(a)) is identified. Examples of typical contaminants are of dense non-aqueous phase liquids (DNAPLs) which may comprise halogenated organics and other persistent contaminants.

If left untreated contaminants diffuse from the source (FIG. 1(a)) enter the groundwater aquifer forming a dissolved groundwater plume (FIG. 1(b)). The present method provides a mixing means (FIG. 2(c)) which is capable of reaching the source from the surface. Examples of suitable mixing means will include auguring machinery and similar devices such as those used by Geo-Con. Inc., Pittsburgh PA and others. Using the mixing means, an effective amount of stabilized degradative agent, such as Bentonite and Fe/Cu metallic couple (FIG. 2(d)) is admixed into the contaminated source.

When using metallic couples as the degradative agent it is preferred if the amount of reductive metal is added at a molar excess with respect to the concentration of halogenated organic contaminant. The remediation reaction will proceed at ambient temperature and pH but it is preferred that the temperature be at least 18° C. and that the pH be adjusted to between 2.0 and 10.0. Although it is not necessary for the reaction conditions to be completely anaerobic, the action of the reductive metal will be enhanced if oxygen is eliminated from the remediation site.

If the principle contaminant is carbon tetrachloride it is anticipated that partial reaction products will include chloroform, methylene chloride, and methyl chloroform as well methane, carbon dioxide, formaldehyde and hydrochloric acid. Contaminant degradation products may be monitored by any means known in the art as for example by gas chromatography in combination with a mass spectrometer.

The admixing of the stabilized reductive reagent into the soil has the effect of reducing the permeability of the contamination source significantly. A permeability reduction of between one and 4 orders of magnitude are expected. Reduction of the soil permeability effectively excludes the groundwater from entering the contamination source and sequestering the organic contaminant. Thus the reduction in permeability combined with the oxidative action of the metallic couple serves to prevent the contaminant from entering the aquifer while, at the same time, degrading the toxic solvent.

After the stabilized reductive reagent has been effectively mixed into the contamination source the permeability has been so reduced as to divert ground water around the source (FIG. 3(e)) and causes the dissipation of the contamination plume (FIG. 3(f)). Over time the presence of the degradative agent in the stabilized degradative reagent reduces the concentration of the stabilized contaminants and prevents further leaching into the environment.

EXAMPLES
MATERIALS AND METHODS

The composition of the metallic couple/metal used in the following examples was in the range of iron (99.9%)/Cu (0.1%) to iron (98%)/Cu (2%) for the Fe/Cu couples, iron(99.95%)/Pd(0.05%), or iron(100%) by weight. Soil used in the following examples was standard Trevino soil, analyzed by A & L Eastern Agricultural Laboratories, Inc., Richmond, Va., and having the following properties:

Soil pH 8.2

Cation Exchange capacity (meq/100 g) 14.6

Percent Sand 50

Percent Silt 45

Percent Clay 5

Textural classification Sandy Loam

Carbon tetrachloride used as a sample contaminant was obtained from Sigma Chemical Company (St. Louis, Mo.) and had the following specifications:

MW 153.82

Melting point: −23° C.

Boiling point: 76.7° C.

Vapor pressure: 90 mm at 20° C. 56 mm at 10° C. 113 mm at 25° C. 137 mm at 30° C.

Solubility: 1,160 mg/l at 25° C. 800 mg/l at 20° C.

Saturation concentration: 754 g/cu m at 20° C. 1109 g/cu m at 30° C.

Unless otherwise specified all other reagents, including bentonite clay, were obtained from the Sigma Chemical Company (Company (St. Louis, Mo.).

Stoichiometric Calculations:

Although both copper and iron comprise the reagent to be added to contaminated soil it is understood that copper is primarily a catalyst for the dehalogenation reaction and therefore the net reaction between carbon tetrachloride and iron can be written as follows:

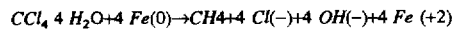

$$CCl_4 + 4\ H_2O + 4\ Fe(0) \rightarrow CH_4 + 4\ Cl(-) + 4\ OH(-) + 4\ Fe(+2)$$

Using the above equation it is possible to calculate that the reaction will require 1.45 grams of iron for each gram of carbon tetrachloride to be degraded. Since it is preferred that a molar excess of reagent be used all of the following examples used in excess of 1.45 grams of iron for each gram of carbon tetrachloride.

Determining Soil Absorption for $CCl_4$:

The carbon tetrachloride used for the test had to be detectable in order to produce useful results. The concentration used had to exceed any irreversible absorption of carbon tetrachloride by the soil. The soil's absorption capacity was determined as follows:

1 g portion of soil was accurately weighed into a 4 mL glass vial with a Teflon lined septum seal. A second vial of soil was prepared as a blank.

10 uL (0.01 mL) of carbon tetrachloride were added to the first vial. The vials were sealed and shaken to mix. The concentration of carbon tetrachloride added to the soil was:

$$(1.594 g/mL \times 0.01\ mL \times 10^6 ug/g)/1g = 15,940 ug/g\ (ppm) or\ 1.594\%$$

The soil was allowed to equilibrate overnight and then analyzed for carbon tetrachloride. The concentration found was 1128 ug/g.

The absorption capacity was calculated as the concentration added minus the concentration found in the analysis, i.e., 15,940 ug/g−1128=14,842 ppm. and was rounded to 15,000 to reflect the relative accuracy of the analysis.

On the basis of the above calculations the concentration selected for testing was set at the absorption capacity plus at least 10,000 ppm (1%). For the sake of experimental convenience, this figure was increased to 20 uL of carbon tetrachloride per gram of soil, or 31,880 ppm.

pH Determinations:

Because soil is known to have a high buffering capacity a test was run to evaluate the effect of adding a dilute acid solution to the soil. Soil was to remove particles larger than ⅛ inch in diameter and subjected to sulfuric acid treatment as follows:

One gram portions of screened soil were weighed into two 8 mL vials.

The soil in the first vial was slurried with 1 mL of 0.5 N H2SO4.

The soil in the second vial was slurried with 1 mL of deionized water.

The pH of both vials was checked using Hydrion paper (Baxter Scientific, McGraw Park Ill.). The following data show the pH changes over time.

| Time (Hours) | pH Determinations | |
|---|---|---|
| | pH of Soil/Acid slurry | pH of Soil/Water Slurry |
| 0 | 4 | 7 |
| 1 | 5 | 7 |
| 18 | 6–7 | 7 |

EXAMPLE 1

DEGRADATION OF CARBON TETRACHLORIDE IN SOIL SAMPLES WITH AN IRON/COPPER METALLIC COUPLE

Example 1 demonstrates the degradation of $CCl_4$ in soil to chloroform in the presence of the metallic couple of iron and copper. Tests were conducted in sealed vials as follows:

One gram portions of screened soil were weighed into twenty-one 8 mL vials. The vials were sealed with hole caps and Teflon-lined septa.

The soil in each vial was spiked through the septum with 20 uL of carbon tetrachloride and allowed to equilibrate overnight.

The vials were divided into three groups of seven vials each. The first group received 0.05 g of iron/copper powder. The second group received 0.05 g of iron. The third group received no metal addition and were used as control samples.

A 1 mL portion of 0.5 N sulfuric acid was added to each of the 21 vials. The vials were shaken until no soil clumps remained either loose in the vials or stuck to the bottoms or sides. The vials were placed in a plastic box attached to a rotating agitator which provided continuous gentle mixing throughout the first 8 hours of treatment.

Samples from each group were analyzed at 0.5, 2, 4, 6 and 8 hours after the addition of the acid. Two vials from each group were held for analysis at one week and two weeks after the start of treatment.

The entire contents of each vial in the test runs were analyzed as a single sample. Extraction of each sample began as soon as its reaction time was completed. The samples were analyzed for volatile organic compounds according to EPA Method 8260, (USEPA SW 846, Method No. 8260, *Gas Chromatography/Mass Spectrometry for Volatile Organics: Capillary Column Technique*, Revision 0, December 1987, Purge and Trap Cleanup, followed by GC/MS analysis). Using this method any purgeable product with a molecular weight greater than 50 Daltons was detected, assuming the appropriate concentration. The chromatograms were evaluated specifically for carbon tetrachloride, chloroform, methylene chloride, and chloromethane. Of those four compounds, only carbon tetrachloride and small quantities of chloroform were found. No other compounds were detected.

The analytical results, expressed in ug/g, are presented below in Tables 2 and 3.

TABLE 2

Analytical Results for Carbon Tetrachloride

| | ug/g | | |
|---|---|---|---|
| Time (Hrs.) | Control | Iron | Fe/Cu |
| 0.5 | 3579 | 960 | 2407 |
| 2 | 316 | 208 | 865 |
| 4 | 2652 | 1230 | 451 |
| 6 | 252 | 516 | 862 |
| 8 | 3041 | 906 | 438 |

TABLE 3

Analytical Results for Chloroform

| | ug/g | | |
|---|---|---|---|
| Time (Hrs.) | Control | Iron | Fe/Cu |
| 0.5 | 27 | 44 | 80 |
| 2 | 3 | 12 | 74 |
| 4 | ND | 274 | 116 |
| 6 | 2 | 225 | 324 |
| 8 | 106 | 494 | 61 |

As can been seen from the $CCl_4$ data, the average concentration detected was 1968 ug/g, 6.17% of the amount originally added. From the data it was determined that only 15,000 ug of carbon tetrachloride added to the samples would be irreversibly absorbed, leaving 17,000 ug available for analysis. That concentration was not found.

As can be seen from the chloroform data, iron/copper couple generates a small concentration of chloroform and then destroys it. Iron alone generated more chloroform (than the iron/copper), and showed no sign of destroying it during the 8 hours of reaction.

The results of the one week samples on a variety of chlorinated organics are as shown in Table 4:

TABLE 4

Results of the 1 Week Samples

| Compound | Control ug/g | Control % | Fe ug/g | Fe % | Fe/Cu ug/g | Fe/Cu % |
|---|---|---|---|---|---|---|
| Chloromethane | ND | NA | BQL | NA | ND | ND |
| Methylene Chloride | ND | NA | 469 | 0.81 | BQL | NA |
| Chloroform | 346 | 0.84 | 1255 | 3.06 | BQL | NA |
| $CCl_4$ | 2025 | 6.35 | 723 | 2.27 | ND | NA |

"ND" indicates that there was no peak for that compound in the sample.
"NA" indicates not applicable.
"BQL" indicates that there was a small peak, but the calculated result was below the quantitation limit for the analysis.
The quantitation limit for all of these compounds was 15 ug/g. The percentages are calculated by the equation: Percent = 100 × ug/g × mol. wt. of compound/Mol. wt of $CCl_4$ × 31880 ug/g
The figure "31880 ug/g" is the amount of carbon tetrachloride added to the one gram samples at the beginning of the test.

EXAMPLE 2

DEGRADATION OF HALOGENATED ORGANICS USING A MIXTURE OF A STABILIZING REAGENT AND A DEGRADATIVE AGENT

Example 2 demonstrates the degradation of $CCl_4$ using a stabilized degradative reagent comprising bentonite clay and a Fe/Cu metallic couple. The experimental proceedure was as follows:

40 ml glass vials were loaded with 17.3 grams Trevino soil and stoichiometrically determined amounts of Fe/Cu powder (0.16% Cu on Aldrich 325 mesh Fe powder) are added to the vial. The stoichiometric amounts of degradative reagent for total dechlorination are given in Table 1. Control samples used no Fe/Cu. After the addition of these reagents the tubes were capped and the solids were mixed together by manual shaking. This action uniformly distributed the metal powder/degradative reagent throughout the soil matrix.

After mixing the vial was reopened, and water added based at 35% by dry soil weight (6.1 g) Next the vial was carefully sealed and the contents carefully and vigorously shaken to wet all the solids.

A predetermined calculated amount of $CCl_4$ was carefully injected through the vial septum via a syringe and the vial vigorously shaken to distribute the $CCl_4$. After shaking the vials were set aside in a carefully monitored Constant Temperature Bath (CTB) for a predetermined amount of time. Reaction times ranged between 0 and 136 hours and temperatures between 15° and 37° C.

The reaction was halted by removing the vials from the CTB and immediately injecting HPLC Grade methanol through the septum to act as an extractant. This quantity of methanol was recorded, and the vials were shaken to distribute the methanol extractant through the soil matrix.

The mixtures settled with the Fe to the bottom of each vial, isolating the reactants. All samples were stored/chilled at 4° C. until subjected to GC analysis with a 4ul sampling of the liquid (supernatant) per injection. Data showing degradation of $CCl_4$ by Fe/Cu metallic couple is shown in Table 5.

The data in Table 5 are sorted by reaction temperature, reaction time, and stochiometric ratio of iron added.

TABLE 5

| Sample | Reagent | Stoich Ratio | Temp °C. | Reaction Tm (Hrs) | % Ben-to. | Starting $CCl_4$ Conc. wt % | % $CCl_4$ Remaining |
|---|---|---|---|---|---|---|---|
| 3B | Fe/Cu | 0 | 15 | 0 | 0 | 0.5 | 57.5 |
| 19B | Fe/Cu | 0 | 15 | 0 | 0 | 2 | 79.5 |
| B3B | Fe/Cu | 0 | 15 | 0 | 5 | 0.5 | 61.3 |
| B19B | Fe/Cu | 0 | 15 | 0 | 5 | 2 | 84.7 |
| -19-12B | Fe/Cu | 3.45 | 15 | 0 | 0 | 2 | 58.0 |
| -18-B12B | Fe/Cu | 3.45 | 15 | 0 | 5 | 2 | 53.0 |
| -19-5A | Fe/Cu | 13.78 | 15 | 0 | 0 | 0.5 | 58.0 |
| -18-B5A | Fe/Cu | 13.78 | 15 | 0 | 5 | 0.5 | 54.0 |
| 26C | Fe/Cu | 1.72 | 15 | 48 | 0 | 2 | 0.6 |
| B26C | Fe/Cu | 1.72 | MS | 48 | 5 | 2 | 4.9 |
| 10C | Fe/Cu | 6.89 | 15 | 48 | 0 | 0.5 | 1.2 |
| B10C | Fe/Cu | 6.89 | 15 | 48 | 5 | 0.5 | 0.0 |
| -19-14B | Fe/Cu | 0 | 15 | 96 | 0 | 2 | 83.0 |
| -19-7A | Fe/Cu | 0 | 15 | 96 | 0 | 0.5 | 66.0 |
| -18-B14B | Fe/Cu | 0 | 15 | 96 | 5 | 2 | 91.5 |
| -18-B7A | Fe/Cu | 0 | 15 | 96 | 5 | 0.5 | 92.0 |
| 17B | Fe/Cu | 3.45 | 15 | 96 | 0 | 2 | 0.0 |
| B17B | Fe/Cu | 3.45 | 15 | 96 | 5 | 2 | 0.0 |
| 1B | Fe/Cu | 13.78 | 15 | 96 | 0 | 0.5 | 0.0 |
| B1B | Fe/Cu | 13.78 | 15 | 96 | 5 | 0.5 | 0.0 |
| 30C | Fe/Cu | 1.72 | 25 | 0 | 0 | 2 | 63.0 |
| B30C | Fe/Cu | 1.72 | 25 | 0 | 5 | 2 | 87.7 |
| 14C | Fe/Cu | 6.89 | 25 | 0 | 0 | 0.5 | 10.4 |
| B14C | Fe/Cu | 6.89 | 25 | 0 | 5 | 0.5 | 11.6 |
| 25C | Fe/Cu | 0 | 25 | 48 | 0 | 2 | 44.2 |
| 9C | Fe/Cu | 0 | 25 | 48 | 0 | 0.5 | 7.0 |
| B9C | Fe/Cu | 0 | 25 | 48 | 5 | 0.5 | 0.0 |
| B25C | Fe/Cu | 0 | 25 | 48 | 5 | 2 | 38.2 |
| 32C | Fe/Cu | 1.72 | 25 | 48 | 0 | 2 | 0.9 |
| 29C | Fe/Cu | 1.72 | 25 | 48 | 0 | 2 | 0.0 |
| -19-11B | Fe/Cu | 1.72 | 25 | 48 | 0 | 2 | 38.5 |
| -19-13B | Fe/Cu | 1.72 | 25 | 48 | 0 | 2 | 55.5 |
| -19-9B | Fe/Cu | 1.72 | 25 | 48 | 0 | 2 | 25.5 |
| 20B | Fe/Cu | 1.72 | 25 | 48 | 0 | 2 | 0.0 |
| 18B | Fe/Cu | 1.72 | 25 | 48 | 0 | 2 | 0.3 |
| 22B | Fe/Cu | 1.72 | 25 | 48 | 0 | 2 | 1.5 |
| 27C | Fe/Cu | 1.72 | 25 | 48 | 0 | 2 | 5.5 |
| B27C | Fe/Cu | 1.72 | 25 | 48 | 5 | 2 | 0.0 |
| B18B | Fe/Cu | 1.72 | 25 | 48 | 5 | 2 | 7.8 |
| B22B | Fe/Cu | 1.72 | 25 | 48 | 5 | 2 | 0.0 |
| B20B | Fe/Cu | 1.72 | 25 | 48 | 5 | 2 | 0.0 |
| -18-B13B | Fe/Cu | 1.72 | 25 | 48 | 5 | 2 | 31.5 |
| -18-B9B | Fe/Cu | 1.72 | 25 | 48 | 5 | 2 | 16.5 |
| -18-B11B | Fe/Cu | 1.72 | 25 | 48 | 5 | 2 | 31.0 |
| B32C | Fe/Cu | 1.72 | 25 | 48 | 5 | 2 | 0.0 |
| B29C | Fe/Cu | 1.72 | 25 | 48 | 5 | 2 | 0.0 |
| 31C | Fe/Cu | 3.45 | 25 | 48 | 0 | 2 | 0.0 |
| B31C | Fe/Cu | 3.45 | 25 | 48 | 5 | 2 | 0.0 |
| 2B | Fe/Cu | 6.89 | 25 | 48 | 0 | 0.5 | 0.0 |
| 4B | Fe/Cu | 6.89 | 25 | 48 | 0 | 0.5 | 0.0 |
| -19-6A | Fe/Cu | 6.89 | 25 | 48 | 0 | 0.5 | 8.0 |
| 16C | Fe/Cu | 6.89 | 25 | 48 | 0 | 0.5 | 0.0 |
| 13C | Fe/Cu | 6.89 | 25 | 48 | 0 | 0.5 | 0.0 |
| B16C | Fe/Cu | 6.89 | 25 | 48 | 5 | 0.5 | 0.0 |
| B11C | Fe/Cu | 6.89 | 25 | 48 | 5 | 0.5 | 0.0 |
| 15C | Fe/Cu | 13.78 | 25 | 48 | 0 | 0.5 | 0.0 |
| B15C | Fe/Cu | 13.78 | 25 | 48 | 5 | 0.5 | 0.0 |
| 24C | Fe/Cu | 1.72 | 25 | 96 | 0 | 2 | 0.0 |
| B24C | Fe/Cu | 1.72 | 25 | 96 | 5 | 2 | 0.0 |
| 8C | Fe/Cu | 6.89 | 25 | 96 | 0 | 0.5 | 0.0 |
| B8C | Fe/Cu | 6.89 | 25 | 96 | 5 | 0.5 | 0.0 |
| -19-1A | Fe/Cu | 0 | 37 | 0 | 0 | 0.5 | 92.0 |
| -19-8B | Fe/Cu | 0 | 37 | 0 | 0 | 2 | 88.5 |
| -18-B1A | Fe/Cu | 0 | 37 | 0 | 5 | 0.5 | 88.0 |
| -18-B8B | Fe/Cu | 0 | 37 | 0 | 5 | 2 | 97.5 |
| 23B | Fe/Cu | 3.45 | 37 | 0 | 0 | 2 | 28.6 |
| B23B | Fe/Cu | 3.45 | 37 | 0 | 5 | 2 | 18.1 |
| 7B | Fe/Cu | 13.78 | 37 | 0 | 0 | 0.5 | 54.3 |
| B7B | Fe/Cu | 13.78 | 37 | 0 | 5 | 0.5 | 0.0 |
| 28C | Fe/Cu | 1.72 | 37 | 48 | 0 | 2 | 0.0 |
| B28C | Fe/Cu | 1.72 | 37 | 48 | 5 | 2 | 0.0 |
| 12C | Fe/Cu | 6.89 | 37 | 48 | 0 | 0.5 | 0.0 |
| B12C | Fe/Cu | 6.89 | 37 | 48 | 5 | 0.5 | 0.0 |
| 5B | Fe/Cu | 0 | 37 | 96 | 0 | 0.5 | 16.1 |
| 21B | Fe/Cu | 0 | 37 | 96 | 0 | 2 | 4.6 |
| B21B | Fe/Cu | 0 | 37 | 96 | 5 | 2 | 35.6 |
| B5B | Fe/Cu | 0 | 37 | 96 | 5 | 0.5 | 16.2 |
| -19-10B | Fe/Cu | 3.45 | 37 | 96 | 0 | 2 | 0.0 |
| -18-B10B | Fe/Cu | 3.45 | 37 | 96 | 5 | 2 | 0.0 |
| -19-3A | Fe/Cu | 13.78 | 37 | 96 | 0 | 0.5 | 0.0 |
| -18-B3A | Fe/Cu | 13.78 | 37 | 96 | 5 | 0.5 | 1.0 |

While a perfect material balance is difficult to achieve in such tests, a number of conclusions can be drawn from these data.

First, it is evident that the Bentonite clay does not affect the reaction progress. The clay neither aids nor retards the dechlorination reaction. It can be concluded that addition of Bentonite clay to retard groundwater movement will not interfere with the destruction.

Additionally the data shows that the dechlorination reaction is mildly aided by increasing temperature, but sufficient reaction velocity is present at normal ambient temperatures.

Further, it is seen that dechlorination progress is greatly dependent on the stoichiometric ratio of Fe/Cu addition, with the largest residual amounts of $CCl_4$ remaining where no Fe/Cu is included.

Finally, it is seen that complete dechlorination takes place at 0.5% and 2% initial concentrations of $CCl_4$. It can be concluded that high concentrations of DNAPL, typical of spill areas, apparently does not interfere with reaction.

EXAMPLE 3

DEGRADATION OF PCE IN SOIL SAMPLES WITH EITHER IRON OR IRON/PALLADIUM METALLIC COUPLE

Example 3 demonstrates the degradation of PCE in soil in the presence of the metallic couple of iron and Palladium and iron alone. Tests were conducted according to the following protocol:

50 ml centrifuge tubes were loaded with 15.0 g of Trevino soil and stoichiometrically determined amounts of Fe powder (Aldrich 325 mesh) or Fe/Pd powder (0.05% Pd on Aldrich 325 mesh Fe) were added to each tube. The determined amount for Fe and Fe/Pd was 5.08X the theoretical minimum amount needed for PCE destruction.

Tubes were capped with a septum cap and the solids were shaken and well mixed. Next the caps were removed and water added at 35% by dry soil weight (5.25 g). The tubes were carefully sealed and vigorously shaken to wet the contents and then 0.75 g of PCE was injected into each tube via a syringe. After injection the tubes were again vigorously shaken.

After shaking the tubes were set aside in the CTB for a predetermined amount of time ranging from 0 hr. to 672 hr.

The reaction was stopped by removing the tubes from the CTB and injecting through the septum a measured amount of HPLC grade methanol as extractant. Next the tubes were vigorously shaken and set in an automated tumbler rotating at ~30 rpm for ~1 hour. Tubes were removed from the tumbler and centrifuged at ~4000 rpm for 5 minutes. Each tube was stored/chilled at 4° C. until GC analysis. All GC analysis used 4ul of supernatant per injection. Data showing the GC analysis of the degradation of PCE is given in Table 6.

TABLE 6

GC analysis of PCE subjected to Fe and Fe/Pd degradative reagent

| Sample | Reagent | Stoich Ratio | Temp °C. | Reaction Tm (Hrs) | % PCE Remaining |
|---|---|---|---|---|---|
| 13 | Fe/Pd | 0 | 25 | 672 | 59.70 |
| 14 | Fe/Pd | 0 | 25 | 672 | 75.72 |
| 15 | Fe/Pd | 5.05 | 25 | 0 | 152.07 |
| 16 | Fe/Pd | 5.05 | 25 | 168 | 15.92 |
| 17 | Fe/Pd | 5.05 | 25 | 288 | 0.52 |
| 18 | Fe/Pd | 5.05 | 25 | 384 | 10.38 |
| 19 | Fe/Pd | 5.05 | 25 | 672 | 0.02 |
| 20 | Fe/Pd | 5.05 | 25 | 0 | 145.43 |
| 21 | Fe/Pd | 5.05 | 25 | 168 | 32.58 |
| 22 | Fe/Pd | 5.05 | 25 | 288 | 3.69 |
| 23 | Fe/Pd | 5.05 | 25 | 384 | 1.88 |
| 24 | Fe/Pd | 5.05 | 25 | 672 | 0.00 |
| 6 | Fe | 5.05 | 25 | 0 | 133.49 |
| 7 | Fe | 5.05 | 25 | 336 | 74.01 |
| 8 | Fe | 5.05 | 25 | 336 | 4.26 |
| 9 | Fe | 5.05 | 25 | 384 | 7.94 |
| 10 | Fe | 5.05 | 25 | 504 | 2.12 |

While it is difficult to achieve exact material balance in such experiments, it is clear from Table 6 that Fe/Pd has rapidly destroyed the PCE. Essentially complete destruction is obtained within a few hundred hours with 5.05 times the theoretical amount of Fe/Pd. Nearly complete destruction of PCE is obtained with pure Fe with the same reaction time. The no-Fe controls show significant PCE remaining, in spite of apparent experimental losses. The conclusion is that PCE concentrations at least as high as 5% can be easily degraded in a short time by this method, with or without Pd. A concentration of 5% or less represents a typical spatial average for a DNAPL spill region containing residual free phase organic and some pooling.

EXAMPLE 4

DEGRADATION OF TCE IN SOIL SAMPLES WITH EITHER IRON OR IRON/PALLADIUM METALLIC COUPLE

Example 4 demonstrates the degradation of TCE in soil in the presence of the metallic couple of iron and palladium and iron alone. Tests were conducted according to the protocol described above in example 3, with 5% TCE being added with other ingredients to 15 grams of soil. Data showing the GC analysis of the degradation of TCE is given in table 7.

TABLE 7

| Sample | Reagent | Stoich Ratio | Temp °C. | Reaction Tm (Hrs) | % TCE Remaining |
|---|---|---|---|---|---|
| 1 | Fe/Pd | 0 | 25 | 672 | 72.6 |
| 2 | Fe/Pd | 0 | 25 | 672 | 52.8 |
| 3 | Fe/Pd | 5.08 | 25 | 0 | 116.2 |
| 4 | Fe/Pd | 5.08 | 25 | 168 | 0.0 |
| 5 | Fe/Pd | 5.08 | 25 | 288 | 0.0 |
| 6 | Fe/Pd | 5.08 | 25 | 384 | 0.0 |
| 7 | Fe/Pd | 5.08 | 25 | 672 | 0.0 |
| 8 | Fe/Pd | 5.08 | 25 | 0 | 127.5 |
| 9 | Fe/Pd | 5.08 | 25 | 168 | 0.0 |
| 10 | Fe/Pd | 5.08 | 25 | 288 | 0.0 |
| 11 | Fe/Pd | 5.08 | 25 | 384 | 0.0 |
| 12 | Fe/Pd | 5.08 | 25 | 672 | 0.0 |
| 1 | Fe | 5.08 | 25 | 0 | 101.7 |
| 2 | Fe | 5.08 | 25 | 336 | 6.0 |
| 3 | Fe | 5.08 | 25 | 336 | 0.3 |
| 4 | Fe | 5.08 | 25 | 384 | 8.2 |
| 5 | Fe | 5.08 | 25 | 504 | 1.9 |

It is clear from Table 7 that Fe/Pd has rapidly destroyed the TCE. Measurably complete destruction is obtained within a few hundred hours with 5.08 times the theoretical amount of Fe/Pd. Less complete, but still very significant, destruction of TCE is obtained with pure Fe with the same reaction time. The no-Fe controls show significant TCE remaining, in spite of experimental losses. The conclusion is that TCE concentrations at least as high as 5% can be easily degraded in a short time by this method with or without Pd. A concentration of 5% or less represents a typical spatial average for a DNAPL spill region containing residual free phase organic and some pooling.

What is claimed is:

1. A process for the metal initiated dechlorination of chlorinated organic compounds in soil at a contamination source comprising; admixing with the soil at said contamination source;

a) an effective amount of a metallic couple, the metallic couple comprising zero valent iron and a catalytic metal, the catalytic metal selected from the group consisting of copper and palladium, wherein said zero valent iron is provided in a molar excess to said chlorinated organic compound and wherein the metallic couple is about 90–95% zero valent iron and about 10–5% metal catalyst, the metallic couple having a final concentration of about 2% to about 5% in the soil;

b) an effective amount of stabilizing reagent, said stabilizing agent selected from the group consisting of bentonite clay and iron chloride mixtures, said stabilizing reagent having a final concentration of between about 2% and 8% in the soil;

wherein said admixing results in the reduction of permeability at said contamination source and;

wherein said zero valent iron is oxidized resulting in the dechlorination of said chlorinated organics.

2. The process of claim 1 wherein said metallic couple is 99.9%–98% Fe/0.1%–2% Cu.

3. The process of claim 1 wherein said metallic couple is 99.95% Fe/0.05% Pd.

4. The process of claim 1 wherein said chlorinated organic compounds are chlorinated alkanes.

5. The process of claim 1 wherein said chlorinated organic compound is selected from the group consisting of chloroform, trichloroethylene (TCE), tetrachloroethylene (PCE), methylene chloride, polychlorinated biphenyls (PCBs) and carbon tetrachloride.

6. The process of claim 1 wherein the iron used in the iron-copper or the iron palladium metallic couple is in the form of iron powder with a mesh size range of 100 mesh to 325 mesh.

7. The process of claim 1 wherein the iron used in the iron-copper or the iron palladium metallic couple is in the form of iron powder with a mesh size range of 100 mesh to 325 mesh.

8. The method of claim 1 wherein the percent copper in the iron-copper couple is 0.16% and the percent palladium in the iron-palladium metallic couple is 0.05%.

9. The process of claim 1 wherein any solid components of the reaction are mixed together first then such solid components are added to any liquid components.

* * * * *

UNITED STATES PATENT AND TRADEMARK OFFICE
CERTIFICATE OF CORRECTION

PATENT NO. : 5,789,649
DATED : August 4, 1998
INVENTOR(S) : Batchelor et al.

It is certified that error appears in the above-identified patent and that said Letters Patent is hereby corrected as shown below:

On the title page, Item [73],

--E. I. du Pont de Nemours and Company, Wilmington, Del. and The Texas A&M University System, College Station, Texas--.

Signed and Sealed this

Twenty-fourth Day of October, 2000

Attest:

Q. TODD DICKINSON

*Attesting Officer*

*Director of Patents and Trademarks*